United States Patent [19]

Reynolds

[11] Patent Number: 4,770,453

[45] Date of Patent: Sep. 13, 1988

[54] MOUNTING STRUCTURE FOR VEHICLE BUMPER ASSEMBLY

[75] Inventor: Thomas Reynolds, Troy, Mich.

[73] Assignee: Chrysler Motors Corporation, Highland Park, Mich.

[21] Appl. No.: 93,445

[22] Filed: Sep. 4, 1987

[51] Int. Cl.⁴ .............................................. B60R 19/24
[52] U.S. Cl. .................................. 293/119; 293/132; 293/155
[58] Field of Search ............... 293/119, 121, 126, 132, 293/134, 155; 411/172, 432, 427

[56] References Cited

U.S. PATENT DOCUMENTS

| | | | |
|---|---|---|---|
| 1,202,690 | 10/1916 | Fageol | 293/155 X |
| 1,565,785 | 12/1925 | Buck | 293/146 |
| 1,646,055 | 10/1927 | Ebaugh | 293/119 |
| 2,331,322 | 10/1943 | Heinick | 411/103 |
| 3,820,772 | 6/1974 | Kerr et al. | 293/134 X |
| 3,834,686 | 9/1974 | Moritz et al. | 293/134 X |
| 3,972,551 | 8/1976 | Fannin | 293/137 X |
| 4,050,714 | 9/1977 | Epp | 403/104 |
| 4,160,561 | 7/1979 | Farnam | 293/1 |

FOREIGN PATENT DOCUMENTS

| | | | |
|---|---|---|---|
| 119052 | 10/1944 | Australia | 411/352 |
| 682498 | 11/1952 | United Kingdom | 411/432 |

*Primary Examiner*—Dennis H. Pedder
*Attorney, Agent, or Firm*—Edward A. Craig

[57] ABSTRACT

Adjustment means are provided to properly position a vehicle bumper assembly. The vehicle bumper assembly includes bumper structure and energy absorbing devices which mount it to vehicle structure. The adjustment means comprise threaded structure permitting rotative motion to move the energy absorbing devices in an axial direction. The threaded structure is adapted to move the bumper assembly a predetermined measured amount measured by opening means which provide for detachable fastening of the assembly in place.

5 Claims, 2 Drawing Sheets

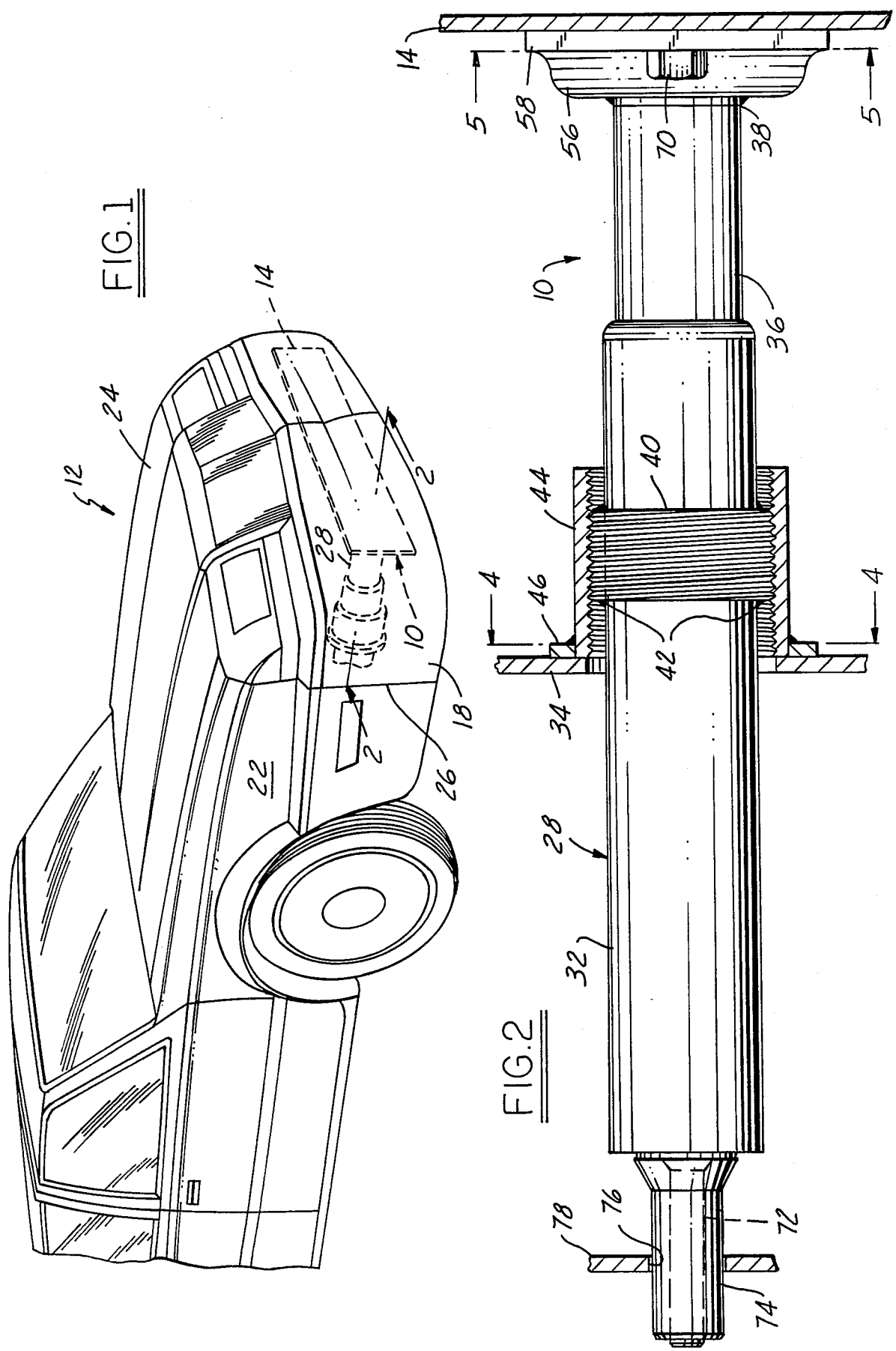

MOUNTING STRUCTURE FOR VEHICLE BUMPER ASSEMBLY

BACKGROUND OF THE INVENTION

1. Field of Invention

The invention relates to mounting structure for a vehicle bumper assembly which permits desired positionment of the bumper assembly with respect to the main vehicle structure by manipulation of threaded means.

2. Prior Art

Government regulations have mandated that front and rear bumpers of vehicles be so constructed and mounted as not to be damaged as a consequence of low speed impact with other vehicles or fixed structure. The prevailing method for accomplishing this is to mount the bumper onto a vehicle by means of an energy absorbing device, such as a shock absorbing structure. When the bumper is impacted at low speeds, the energy absorbing device collapses, absorbing the energy of impact. This collapse takes with it the bumper which moves towards the vehicle. After being impacted, the energy absorbing devices bias the bumper back to its normal position.

One problem which has been encountered in connection with the mounting of vehicle bumper assemblies including energy absorbers has been proper alignment of the bumper assembly with other portions of the vehicle. This problem has been particularly acute with respect to alignment of the end portions of the bumpers with fender structure of a vehicle. Modern perceptions of "fit and finish" do not permit the existence of any substantial gaps between adjacent outer body panels. One method for adjusting the positionment of the bumper has been the use of shims between the energy absorbers and the bumper structure. This technique is discussed in U.S. Pat. No. 4,160,561, Farnam et al, July 10, 1979, entitled "Vehicle Bumper Shim and Method".

Another technique which has been employed to eliminate the appearance of a gap between the bumper structure and vehicle fenders has been to provide a flexible panel portion on each end of the bumper. This flexible portion has been long enough to extend slightly over the adjacent vehicle fenders so that even if the bumper structure is not close enough to the fenders to prevent the presence of a gap, the gap is covered by the overlapping panel structure. This is objectionable from a style standpoint because it adds an extra vertical line to the vehicle body structure which is not part of the coordinated design intended by the stylist. Alternately, overlap has been avoided by directly attaching the flexible panels to the fender. However, this has sometimes resulted in objectionable appearance (wrinkles or bulges) or has required a floating attachment of the bumper facia to a bumper beam.

The present invention provides an alternate means for mounting the bumper assembly by use of support structure including threaded means which permit forward or rearward adjustment of the bumper assembly as desired. Use of threaded means to permit bumper adjustment has been broadly suggested in the past, as for example, U.S. Pat. No. 1,565,785, Buck, Dec. 15, 1925 and U.S. Pat. No. 1,646,055 Ebaugh, Oct. 18, 1927. However, the present invention provides a refined version which permits accurate, measured adjustment of the bumper assembly to achieve the desired final aligned position of the bumper structure. The adjusting means permits limited forward or rearward adjustment and includes two separate structures which permit manipulation of the energy absorbing device, one without the bumper attached and the other with the bumper attached, the technique used depending upon the configuration of vehicle support structure which is encountered.

SUMMARY OF THE INVENTION

The vehicle bumper assembly comprises a bumper structure for receiving impact forces. An energy absorbing device is secured between the bumper structure and vehicle support structure to mount the bumper structure. The energy absorbing device includes a cylinder which is detachably fastened to vehicle support structure. A piston is slidably received in the cylinder. The piston is detachably fastened at the outer end thereof to the bumper structure. Means are provided within the cylinder to absorb energy upon impact of the bumper with subsequent movement of the piston into the cylinder. This structure is improved in accordance with the present invention by providing an externally threaded portion on the cylinder intermediate the ends thereof. An internally threaded collar is threadingly received on said threaded portion. At least one of the collar and outer end of the piston has a radially outwardly extending flange portion. The flange portion is provided with at least two circumferentially spaced apart openings therein. The respective one of said vehicle structure and said bumper structure has mating openings therein.

The spacing of the openings is related to the pitch of the threaded portion so that relative turning of the cylinder and collar from a position where the openings mate to a second position where the openings again mate results in a predetermined measured amount of axial movement of the energy absorber with respect to the collar, which movement represents a desired final positional alignment of the bumper structure with respect to the vehicle. Preferably, this movement is about one millimeter. Also, preferably a flange structure is provided along with mating openings in the vehicle structure on both the collar and the outer end of the piston. The mating openings receive fastening means to detachably secure the respective elements together.

DESCRIPTION OF THE DRAWINGS

FIG. 1 is a view in perspective of a vehicle illustrating one embodiment of the vehicle bumper assembly of the present invention mounted on the front end thereof;

FIG. 2 is a sectional view taken substantially along the line 2—2 of FIG. 1 looking in the direction of the arrows;

DESCRIPTION OF THE PREFERRED EMBODIMENT

Figure 3:
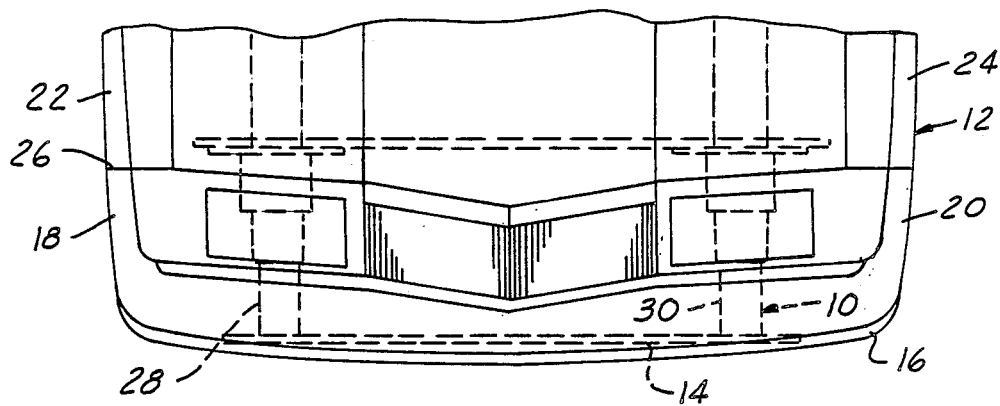
FIG. 3 is a top plan view of the front end portion of the vehicle of FIG. 1.

Referring to FIGS. 1 and 3, it will be noted that a vehicle bumper assembly 10 is mounted on the front end of a vehicle 12, shown as an automobile. The vehicle bumper assembly 10 may, however, be mounted on other vehicle forms, such as light trucks, vans and the like. Additionally, the vehicle bumper assembly 10 may be mounted on the rear of the vehicle 12 as well as on the front.

The vehicle bumper assembly 10 includes a conventional bumper beam 14 which functions as a structural member for receiving impact forces which may be encountered as a consequence of hitting another vehicle or a fixed object. The bumper beam 14 has fixed thereto a soft bumper facia 16 which is essentially ornamental. As will be noted, the facia 16 extends across the front of the vehicle 12 and has end portions 18, 20 which extend around the sides of the vehicle for a short distance. The end portions 18, 20 may be longer or shorter than illustrated. They terminate at the edge of sheet metal defining fenders 22, 24. A line 26 is defined at this juncture. Portions 18, 20 are conventionally attached to fenders 22, 24 at juncture 26.

A pair of spaced apart energy absorbing devices 28, 30 are secured to the bumper beam 14 to complete the vehicle bumper assembly 10. The energy absorbing devices bias the bumper structure to a normal position as shown in the figures. Each energy absorbing device comprises a cylinder 32 which is detachably fastened to vehicle support structure 34, the structure 34 being a structural rail forming part of the vehicle framing. A piston 36 is slidably received in the cylinder 32. The piston 36 is detachably fastened at the outer end 38 thereof to the bumper beam 14. As is common in the art, means are provided within the cylinder 32 to absorb energy upon impact of the bumper which results in subsequent movement of the piston 36 into the cylinder 32. The energy absorbing means may be hydraulic, pneumatic, a compressible composition, such as a springy plastic material, or the like. The specific type of energy absorbing device is not germane to the present invention, the present invention functioning with various styles of such devices. The energy absorbing devices permit movement of the bumper a short distance towards the vehicle on which they are mounted after a low speed impact with another vehicle or stationary structure without appreciable damage to the bumper structure. After the impacting force is dissipated, the bumper structure is returned to its original position by the energy absorbing devices. As above mentioned, such bumper mounting constructions are common in the automotive industry at this time.

As will be noted in FIG. 2, an externally threaded portion 40 is provided on the cylinder 32 intermediate the ends thereof. The externally threaded portion comprises a tubular structure having the threads provided on the outer surface thereof. This structure is slidingly received over the cylinder 32 and fixed in place as by welding at 42.

Figure 4:
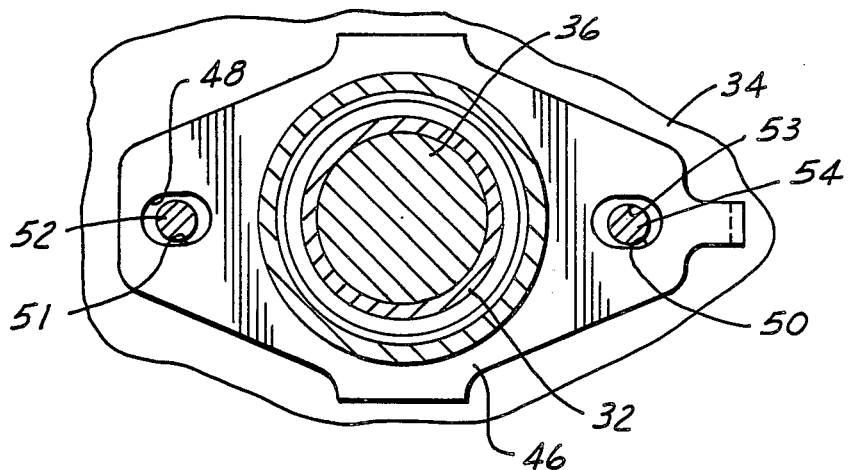
FIG. 4 is a sectional view taken along the line 4—4 of FIG. 2 looking in the direction of the arrows.

An internally threaded collar 44 is threadingly received on threaded portion 40. As will be noted in FIGS. 2 and 4, the collar 44 has a radially outwardly extending flange portion 46. Two circumferentially spaced apart openings 48, 50 are provided in the flange portion 46. The vehicle structure 34 has mating threaded openings 51, 53 therein which receive threaded bolts 52, 54 to detachably secure the collar 34 to the structure 34.

Figure 5:
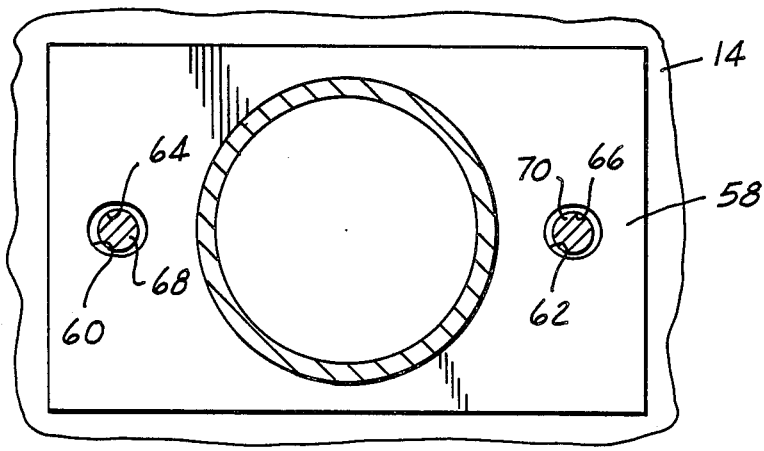
FIG. 5 is a sectional view taken substantially along the line 5—5 of FIG. 2 looking in the direction of the arrows.

The outer end 38 of the piston 36 has similar structure for detachable fastening to the bumper beam 14. As will be noted, a bracket 56 is secured to the outer end of the piston. The bracket 56, as shown in FIGS. 2 and 5, has a radially outwardly extending flange portion 58 in which are provided two circumferentially spaced apart openings 60, 62. Mating threaded openings 64, 66 are provided in the bumper beam 14. Threaded bolt structures 68, 70 pass through openings 60, 62 and are threadingly received in openings 64, 66 to detachably secure the outer end 38 of the piston 36 to the bumper beam 14.

It will thus be appreciated that the collar 44 acts to detachably fasten the cylinder 32 to vehicle support structure and the bracket 56 acts to detachably secure the piston 36 to the bumper beam 14.

As will be noted in FIG. 2, the cylinder 32 extends beyond support structure 34 and terminates in a stem 72. The stem 72 has an isolator cap 74 thereon, the cap 74 being preferably fabricated of a plastic material. The cap 74 is slidingly received in an opening 76 provided in vehicle support structure 78. This structure acts as stabilizing means for the energy absorbing devices, it being appreciated that each energy absorbing device 28, 30 is mounted in like manner, thus ensuring proper alignment of the bumper structure and proper action of the energy absorbing devices when needed. During adjustment of the bumper assembly, the cap 74 is free to slide in the opening 76 to accommodate axial movement of the energy absorbing device.

The spacing of the openings 48, 50 and the mating openings 51, 53 and also the openings 60, 62 and mating openings 64, 66 is related to the pitch of the threaded portion 40 (and thus also to the internal threads of the collar 44) so that relative turning of the cylinder 32 and collar 44 from a position where the openings meet to a second position where the openings again meet results in a predetermined measured amount of axial movement of the energy absorber with respect to the collar which movement represents a desired final positional alignment of the bumper structure with respect to the vehicle. The preferred amount of movement of the energy absorber from the position where the openings mate to a second position wherein the openings again mate is one millimeter. This is accomplished in an actual embodiment with a thread specification as follows: M54X2.00 ISO CLASS 6 g THD. It is thus possible to adjust the bumper structure so that any gap between the end portions 18, 20 and fenders 22, 24 will be no more than one millimeter. Additionally, it is possible to predetermine the number of necessary turns of the threads in order to bring the desired alignment into effect.

The desired adjustment of the vehicle bumper assembly 10 may be accomplished either by turning the collar 44 on the cylinder 32 with the outer end 38 of the piston 36 attached to the bumper beam 14, or by turning the entire energy absorber with the collar 44 attached to the structure 34 and the outer end 38 with the piston unattached to the bumper beam 14. In either case, after the desired adjustment has been made, the element which is loose is fastened. The choice of which method to use depends the configuration of the vehicle in which the bumper assembly 10 is mounted. In some cases, the configuration of the available support structure 34 may be such as to prevent turning of the collar 44. In such a case, the collar 44 is first secured to the structure 34. The entire energy absorbing devices then turn with the bumper beam 14 being detached from the piston 36. In such an instance, it is necessary to use a fixture to determine when the proper amount of adjustment has been made inasmuch as the bumper facia 16 and end portions 18, 20 will not be available for visual inspection. The measured amount of movement of the energy absorbing device 28 per manipulation permits a predetermination of the amount of turns which are necessary.

In the embodiment shown, the openings are spaced apart on the flanges at 180 degree intervals. However, it will be appreciated that other intervals may be used. For example, three, four etc. may be used as desired. In the present embodiment a one-half turn of either the collar 44 or energy absorbing device results in the desired one millimeter advance.

As will be noted in FIG. 2, threaded portions of the collar 44 extend in either direction from the externally threaded portion 40, thus permitting axial movement in either direction for the desired adjustment. In an actual embodiment, each of these portions are about one-half inch for adjustment one-half inch in either direction. Three eighths of an inch is considered to be the maximum desired adjustment, the extra increments being provided to compensate for the initial position of the externally threaded portion 40 within the collar 44.

I claim:

1. In a vehicle bumper assembly comprising a bumper structure for receiving impact forces, at least one energy absorbing device secured between the bumper structure and vehicle support structure to mount said bumper structure, the energy absorbing device including a cylinder detachably fastened to said vehicle support structure, a piston slidably received within the cylinder, the piston being detachably fastened at an outer end thereof to the bumper structure, the improvement comprising an externally threaded portion on the cylinder intermediate the ends thereof and having a diameter larger than the diameter of said cylinder, an internally threaded collar threadingly received on said threaded portion, at least one of the collar and said outer end of the piston having a radially outwardly extending flange portion, the flange portion having at least two circumferentially spaced apart openings therein, a respective one of said vehicle structure and bumper structure having mating openings therein, the spacing of the openings being related to the pitch of said threaded portion so that relative turning of the cylinder and collar from a position where the openings mate to a second position where the openings again mate results in a predetermined measured amount of axial movement of the energy absorber with respect to the collar which movement represents a desired final positional alignment of the bumper structure with respect to the vehicle support structure, the mating openings receiving detachable fastening means to detachably secure the respective elements together.

2. The vehicle bumper assembly of claim 1, further characterized in that said flange portion is provided on the collar and said mating openings are provided in the vehicle support structure.

3. The vehicle bumper assembly of claim 1, further characterized in that said flange portion is provided on the outer end of the piston and said mating openings are provided in the bumper structure.

4. The vehicle bumper assembly of claim 1, further characterized in that a flange portion having at least two circumferentially spaced apart openings therein is provided on both the collar and on the outer end of the piston and each of said vehicle support structure and said bumper structure has mating openings for, respectively, the spaced apart openings in the flange portion on the collar and the spaced apart openings in the flange portion on the outer end of the piston.

5. The vehicle bumper assembly of claim 1, further characterized in that the predetermined measured amount of axial movement of the energy absorber with respect to the collar upon relative turning of the cylinder and collar from a position where the openings mate to a second position where the openings again mate is about one millimeter.

* * * * *